United States Patent [19]

Hirose et al.

[11] 4,423,303

[45] Dec. 27, 1983

[54] APPARATUS FOR TREATING POWDERY MATERIALS UTILIZING MICROWAVE PLASMA

[75] Inventors: Masahiko Hirose; Katsutoshi Nishida, both of Yokohama, Japan

[73] Assignee: Tokyo Shibaura Denki Kabushiki Kaisha, Kawasaki, Japan

[21] Appl. No.: 260,755

[22] Filed: May 5, 1981

[30] Foreign Application Priority Data

May 6, 1980 [JP] Japan .................. 55-58608
Jan. 27, 1981 [JP] Japan .................. 56-09661

[51] Int. Cl.$^3$ .................. B23K 9/00; B23K 9/225
[52] U.S. Cl. .................. 219/121 P; 219/121 PM; 219/121 PX; 219/10.55 A; 219/121 PG; 204/164; 315/111.21; 373/18
[58] Field of Search .................. 219/10.55 R, 10.55 A, 219/121 P, 121 PY, 121 PR, 121 AG, 121 PD, 121 PX; 204/164, 157.1 H; 250/531; 315/111.2; 373/18

[56] References Cited

U.S. PATENT DOCUMENTS

| 3,834,038 | 9/1974 | Jarda .................. 219/10.55 A |
| 3,937,917 | 2/1976 | Consoli .................. 219/10.55 R |
| 4,065,369 | 12/1979 | Ogawa et al. .................. 219/121 PG |
| 4,090,055 | 0/0000 | King .................. 219/121 P |
| 4,153,527 | 5/1979 | Greenwald, Jr. .................. 204/164 |
| 4,207,452 | 6/1980 | Arai .................. 219/10.55 R |
| 4,339,326 | 7/1982 | Hirose et al. .................. 204/164 |

FOREIGN PATENT DOCUMENTS

| 2623423 | of 0000 | Fed. Rep. of Germany ... 219/121 P |
| 2632194 | of 0000 | Fed. Rep. of Germany ... 219/121 P |
| 2837594 | 3/1979 | Fed. Rep. of Germany ...... 219/121 PY |
| 2272032 | of 0000 | France .................. 219/121 P |
| 54-16480 | 6/1979 | Japan .................. 219/121 P |

OTHER PUBLICATIONS

Chemicals Abstracts, vol. 69, 1968, p. 8360, col. 2, "Plasma Jet in the Production of Nitrides".
"Microwave Beam Roaster", Hamid et al, Journal of Microwave Power, Copywright 1975, pp. 109–114.

Primary Examiner—M. H. Paschall
Attorney, Agent, or Firm—Schwartz, Jeffery, Schwaab, Mack, Blumenthal & Koch

[57] ABSTRACT

The apparatus includes a microwave generating device and, a waveguide connected with the microwave generating device. A reaction vessel disposed through the waveguide and supplied with a powdery material to be treated with a reaction gas. Pumps are provided for exhausting the reaction vessel. The reaction vessel comprises a vertically elongated vessel having a bottom above which a plasma generating area is formed. In one embodiment, the reaction vessel further comprises a bottom plate horizontally supported in the reaction tube and connected so as to be vertically slidable within the reaction tube.

7 Claims, 5 Drawing Figures

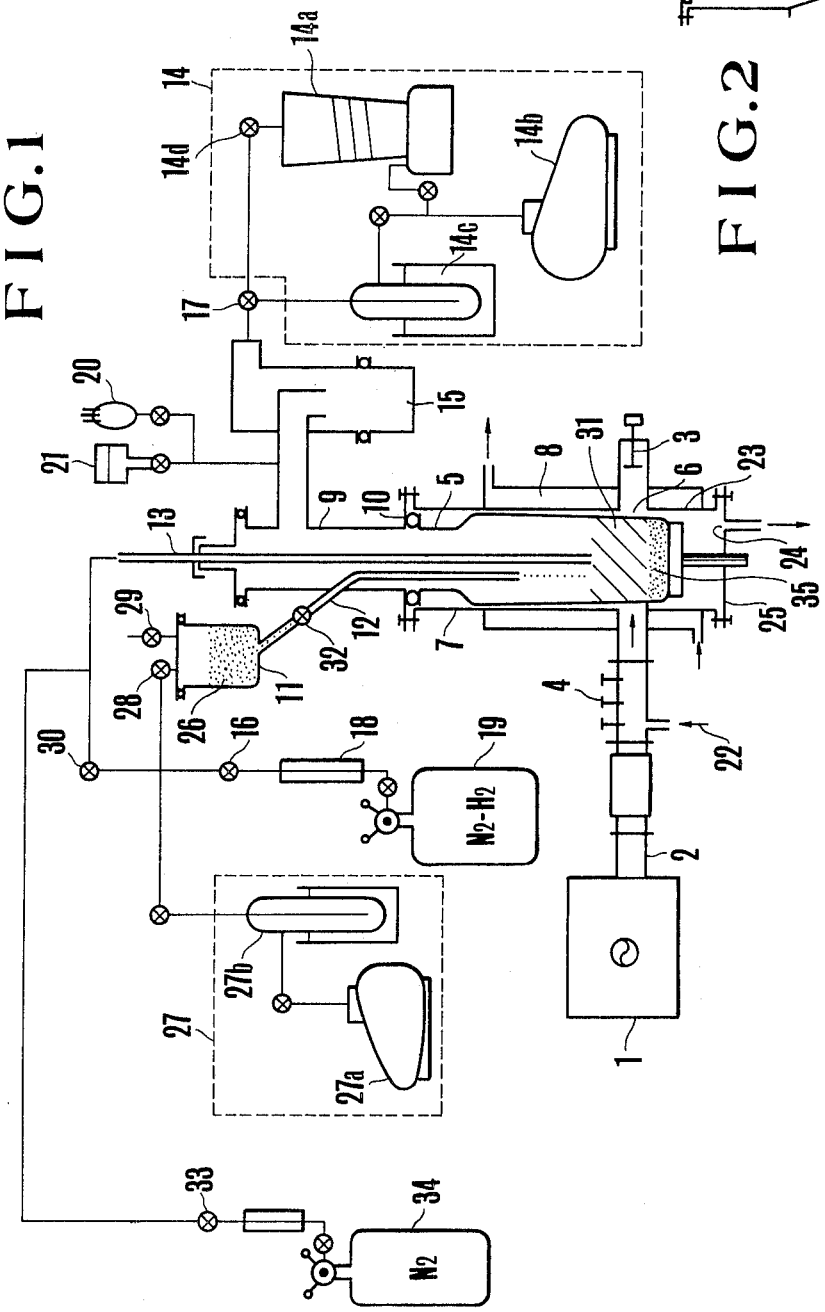
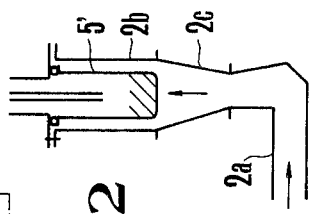
FIG.1
FIG.2

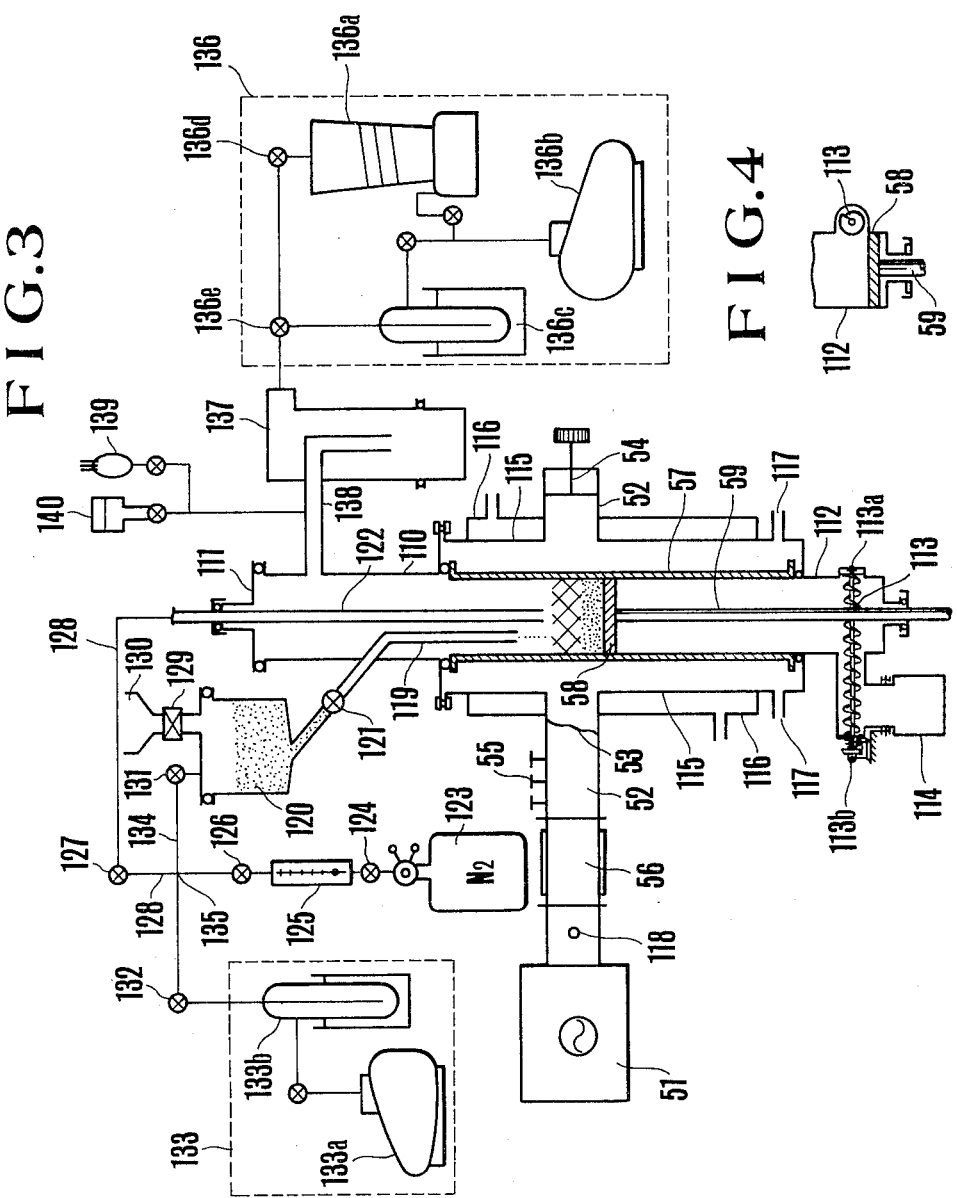

4,423,303

APPARATUS FOR TREATING POWDERY MATERIALS UTILIZING MICROWAVE PLASMA

BACKGROUND OF THE INVENTION

1. Field of the Invention

This invention relates to a treatment apparatus utilizing microwave discharge plasma, and more particularly an apparatus for treating powdery materials by use of microwave plasma.

2. Discussion of Related Art

There is generally known a process in which a powdery material is treated as by using an electric furnace to convert it into or synthesize a chemical material. In the electric furnace, the powdery material to be treated is externally heated in an atmosphere of reaction gas to cause the material to react with the reaction gas. Such a process is, however, disadvantageous in that a large amount of thermal energy is lost from the heating furnace thus reducing the thermal efficiency, a large amount of reaction gas is consumed and it is difficult to uniformly treat the powdery material.

Another process is also known in which powdery materials are treated by use of a torch of high-pressure plasma. This process also has disadvantages in that a large amount of reaction gas is consumed and that it is difficult to produce a plasma in its stable state.

If microwave discharge plasma is used to treat powdery materials in distinction to the above processes, energy efficiency would be increased and also a decreased amount of reaction gas would be required. Where powdery materials are treated by use of plasma, especially microwave discharge plasma, however, a stream of plasma observed as a kind of blast (plasma blast) is formed in the plasma reaction area for unknown reason. The prior art apparatus utilizing the microwave discharge plasma is so designed that a reaction tube is horizontally disposed to supply it with reaction gas and plasma laterally of the tube. Therefore, the powdery materials to be treated may be blown off downstream by the plasma blast in the reaction tube so that the amount of treated material to be recovered is decreased. Moreover, a separate agitating means must be provided for realizing a uniform treatment. This results in a treatment apparatus having a complicated structure. Furthermore, it is desirable that the treatment efficiency can be increased by using a continuous treatment process in which an amount of treated powder is being removed while the same amount of powder to be treated is being supplied. It is, however, difficult to realize such a continuous treatment process in the prior art treating apparatuses. If realized, they have reduced treatment efficiency.

SUMMARY OF THE INVENTION

It is an object of this invention to provide an apparatus for treating powdery materials utilizing microwave plasma which overcomes the above disadvantages in the prior art and which requires a smaller amount of reaction gas with higher energy efficiency and yet with higher recovery for powdery treated materials and which provides a continuous and uniform treatment without any special agitating means.

In order to accomplish the above object, this invention provides an apparatus for treating powdery materials utilizing microwave plasma, including means for generating a microwave, a waveguide connected with said microwave generating means, a reaction vessel disposed through said waveguide, means for supplying said reaction vessel with a powdery material to be treated, means for supplying said reaction vessel with a reaction gas and means for exhausting said reaction vessel, which is characterized in that said reaction vessel comprises a vertically elongated vessel having a bottom above which a plasma generating area is formed, said vessel being disposed such that its central axis is oriented substantially in the direction of gravity, or, in another embodiment of the invention, in that said reaction vessel comprises the reaction tube disposed substantially vertically therein and a horizontal bottom plate supported in said reaction tube, said bottom plate being vertically movable.

BRIEF DESCRIPTION OF THE DRAWINGS

The present invention will now be described in detail with reference to the accompanying drawings, in which;

FIG. 1 is a schematic illustration showing an embodiment of the apparatus according to this invention;

FIG. 2 is a partial schematic illustration showing an alternative manner for transmitting the electric microwave power;

FIG. 3 is a schematic illustration showing another embodiment of the apparatus according to this invention;

FIG. 4 is a sectional schematic illustration showing a side view of a portion of the apparatus shown in FIG. 3.

DETAILED DESCRIPTION OF THE PREFERRED EMBODIMENT

Figure 5:
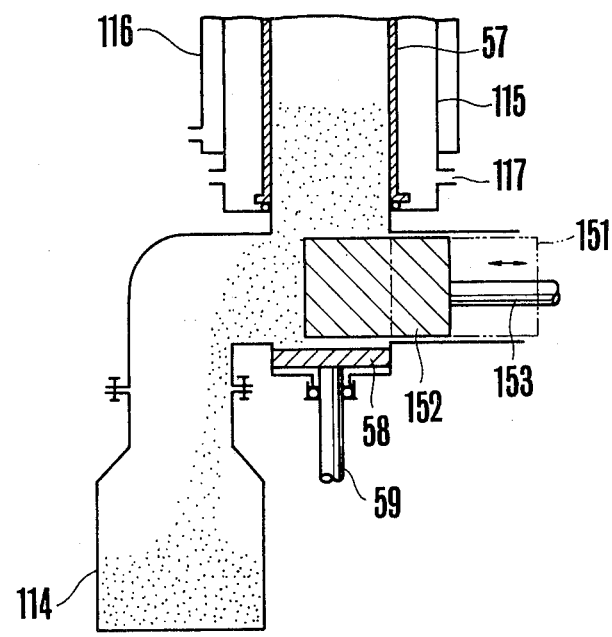
FIG. 5 is an enlarged sectional illustration showing another form of a powder collection structure.

In FIG. 1, which shows an apparatus of this invention for reducing and nitriding silica powder ($SiO_2$) into its nitride ($Si_3N_4$) under the influence of microwave discharge plasma of a blended gas of nitrogen and hydrogen, reference numeral 1 designates a microwave generating device from which a microwave of 2450 MHz in frequency is transmitted through a waveguide 2 (JIS standards, WRJ-2). The waveguide 2 includes means for matching the transmitted microwave, that is, a plunger 3 and a three-stub tuner 4. Reference numeral 5 denotes a vertically elongated reaction tube disposed in a microwave discharge cavity 6 which is connected with the three-stub tuner 4. The reaction tube 5 is made of a microwave transmissible material such as quartz and has a bottom. The reaction tube 5 is positioned perpendicular to the longer sides of the waveguide 2 having a rectangular cross-section, that is, parallel to the direction of an electric field at its maximum in a basic mode $TE_{10}$ and oriented to have its axis in the direction of gravity.

Although the electric microwave power is transmitted laterally of the reaction tube 5, that is, in a direction perpendicular to the axis of the reaction tube 5 in FIG. 1, a waveguide 2a of rectangular cross-section may be connected with a waveguide 2b of circular cross-section through a connecting adaptor 2c to transmit the electric microwave power from the bottom of a reaction tube 5' which is disposed vertically in the circular waveguide 2b, as shown in FIG. 2. Reference numeral 7 designates a sleeve for preventing the microwave from leaking out of the microwave discharge cavity 6. The outer wall of the sleeve 7 is cooled by cooling water 8.

The reaction tube 5 is air-tightly connected with a cylindrical exhausting tube 9 made of, for example, stainless steel through an O-ring 10. The cylindrical exhausting tube 9 is also connected with a powder vessel 11, a reaction-gas cylinder 19 and a reaction-gas exhausting means 14. Reference numeral 12 denotes a powder introducing pipe for feeding the powdery material from the powder vessel 11 to the reaction tube 5. Reference numeral 13 designates a reaction-gas introducing pipe for introducing a reaction gas from the reaction-gas cylinder 19 to the reaction tube 5 through a flowmeter 18 and valve 16. This reaction-gas introducing pipe 13 also serves as a pipe for introducing nitrogen gas from a nitrogen cylinder 34 after the powdery material has been treated. Although these introducing pipes 12 and 13 are shown to be separately located in the illustrated embodiment, they may be combined with each other into an integrally formed pipe such that the powder introducing pipe is enclosed by the gas introducing pipe.

The reaction-gas exhausting means 14 comprises a diffusion pump 14a, a rotary pump 14b and a cold trap 14c. The exhausting means 14 is connected with a cylindrical exhausting tube 9 through a powder collecting and recovering device 15 for preventing the powdery material from entering the valve 17 and the reaction system into the exhausting means 14. Reference numeral 20 designates an ionization vacuum gauge for measuring vacuum in the system composed of the reaction tube 5 and the cylindrical exhausting tube 9 during exhaustion. Reference numeral 21 denotes a diaphragm type pressure gauge for measuring pressure in said system during treatment. Reference numeral 27 indicates an exhausting device forming a portion of the powder supplying device 11 and comprises a rotary pump 27a and a cold trap 27b. The exhausting device 27 is used to remove air from the system prior to treatment at the same time as the powder supplying device is supplied with silica powder from the exterior of the system.

Reference numeral 22 denotes a pipe for introducing a cooling gas such as air or nitrogen gas to forcibly cool the reaction tube 5 after treatment. This pipe 22 is located in the waveguide at a suitable position. Reference numeral 23 designates a sleeve connected with the microwave discharge cavity 6. The sleeve 23 includes a closure 25 for preventing the microwave from leaking which is detachably mounted thereon and has an outlet 24 for said cooling gas.

Since the apparatus of this invention is constructed as described above, the bottom portion of the reaction tube 5 provides a local recovering section in which the powdery material is always influenced by a vertical force. For this reason, the powdery material blown up by the plasma blast stays in a microwave discharge plasma reaction area (shown by oblique lines in FIG. 1) for a certain period of time and thereafter is deposited under the influence of gravity on the bottom of the reaction tube 5 which is the local powder recovering section. The unreacted powder portion in the deposited-on-bottom powder material can subsequently be caused to react with the enlarged plasma. In the apparatus of this invention, the powdery material is agitated by the plasma blast in the plasma reaction area so that the reaction can be effected in a uniform fashion.

The synthesizing reaction for nitriding silica powder under the influence of the microwave discharge plasma by use of the apparatus of this invention will now be described below in a concrete manner:

Amorphous silicon dioxide super fines (average particle size is 18 nm) as silica powder were granulated into particles having a few hundred $\mu$m by water. The powder 26 had been previously charged in the powder vessel 11. Thereafter, the valve 28 was opened and then the exhausting device 27 was actuated to exhaust from the powder vessel 11 such an amount of air that had entered thereinto during charging. At this time, a blended gas of nitrogen and hydrogen (reaction gas) may be fed to the powder vessel 11 from the reaction-gas cylinder 19 by opening the valve 16 after the air has been exhausted from the powder vessel 11 by means of the exhausting device 27, if required. Thereafter, silica powder may be resupplied as blended gas of nitrogen and hydrogen is being fed to atmosphere through the powder vessel 11 via the valve 29 to prevent air (particularly, oxygen) and moisture from entering into the powder vessel 11.

In such a condition that the silica powder 26 had been not charged into the reaction tube 5, the diffusion pump 14a in the exhausting means 14 was actuated to exhaust the reaction tube 5 to about $10^{-6}$ Torr. Thereafter, the valve 14d in the diffusion pump 14a was closed whereas the valve 30 was opened to introduce a blended gas of 25% by volume of nitrogen and 75% by volume of hydrogen from the reaction-gas cylinder 19 to the reaction tube 5 through the gas introducing pipe 13 resulting in a pressure of 5 Torr in the system. The ratio of nitrogen to hydrogen in the blended gas may be optionally varied depending on the purpose or condition for treatment. The flow rate of the blended gas was maintained at about 100 cc/min by controlling the valve 16 and actuating the rotary pump 14b in the exhausting means 14 such that the reaction tube would always be extracted through the cold trap 14c which was cooled by liquid nitrogen.

In such a condition, the valve 32 was opened to supply the reaction tube 5 with said silica powder 26 through the powder introducing pipe 13 at flow rate of 1.5 g/min to be deposited on the bottom of the reaction tube 5. At the same time as or before the silica powder was introduced, microwave discharge was produced with an electric microwave power of 2 KW and a frequency of 2450 MHz from the microwave generating device 1, so that a plasma 31 of the nitrogen and hydrogen blended gas was produced at the bottom of the reaction tube 5. At this time, active seeds such as nitrogen ions, nitrogen-hydrogen molecular ions or various radicals were produced to promote the synthetizing reaction for reducing and nitriding the silica powder.

During the above reaction, the supplied silica power of very light weight was blown up by the produced plasma and automatically agitated in the plasma reaction area resulting in a uniform reaction. Thereafter, the agitated powder was gradually deposited on the bottom of the reaction tube 5.

After the synthesizing reaction for reducing and nitriding the powder under the action of plasma had been carried out for four hours, the discharge was terminated. The valves 30, 32 and 16 were closed whereas the valve 33 was opened to introduce nitrogen gas from the gas cylinder 34 to the reaction system through the gas introducing pipe 13 until the pressure in the reaction system became equal to atmosphere. Simultaneously, air was introduced into the three-dimensional microwave transmitting circuit through the introducing pipe 22 to cool the reaction tube 5.

Thereafter, all the gas supply was cut off and then the closure 25 was removed to draw the reaction tube 5 out of the exhausting tube 9 into the exterior of the system.

Gray-colored particles were observed at the bottom of the reaction tube 5.

The resultant powder was recognized to be silicon nitrite ($Si_3N_4$) by use of X-ray diffractometry, infrared absorption spectrum, elementary analysis and the like.

The resultant silicon nitride weighed about 270 g for the amorphous silicon dioxide powder of 360 g. As a result, the recovery was 96%.

Another embodiment of this invention will be described below mainly with reference to FIG. 3.

Referring to FIG. 3, reference numeral 51 designates a microwave generating device, including, for example, a magnetron which generates a microwave of 2450 MHz in frequency. The microwave is transmitted through a waveguide 52 (for example, based on JIS standards, WRJ-2). In FIG. 3, the waveguide 52 is shown in section at its right-hand portion from a zig-zaged line 53. The waveguide 52 includes means for matching the transmitted microwave, that is, a plunger 54 which is mounted thereon.

The waveguide 52 also includes a three-stub tuner 55 and isolator 56 which are mounted thereon.

A cylindrical reaction tube 57 is disposed vertically through the waveguide 52. More particularly, the reaction tube 57 is located vertically relative to the longer sides of the horizontally disposed waveguide 52 having a rectangular cross-section and also parallel to the direction of an electric field at its maximum in a basic mode $TE_{10}$. This reaction tube 57 is made of a microwave transmissible material such as quartz.

A disc 58 serving as a bottom plate is supported by means of a supporting rod 59 in the reaction tube to be movable vertically therein. The supporting rod 59 is connected with drive means (not shown) such that the disc 58 can be optionally reciprocated vertically. The bottom plate 58 is desirably made of such a material that is stable for plasma and contains no metallic impurity. Quartz is generally suitable for this purpose. If a reducing reaction is carried out as described hereinafter, the bottom plate 58 may be made of graphite or the like. In fact, the bottom plate 58 may be made of any material that does not interfere with the respective reaction. The disc 58 is slidable relative to the reaction tube 57 with substantially no clearance therebetween to form a reaction vessel for powdery materials to be treated.

With the top end of the reaction tube 57 is air-tightly connected a cylindrical exhausting tube 110 of stainless steel through an O-ring. The top end of the exhausting tube 110 is air-tightly closed by means of an upper closure 111 through an O-ring. A lower closure structure 112 of stainless steel is air-tightly connected with the bottom end of the reaction tube 57 through an O-ring. The lower closure 112 includes a screw conveyor 113 for carrying the treated powdery material to a removable container 114 in a continuous fashion. The screw conveyor 113 is located horizontally in the lower closure 112 at such a position that the screw conveyor 113 does not contact the bottom plate 58 when plate 58 has been moved to its lowest position.

FIG. 4 is a cross-sectional side view of the lower closure structure 112 in which the bottom plate 58 is shown at its lowest position.

The screw conveyor 113 includes one end rotatably supported by the lower closure 112 and the other end connected with a drive. The clearance between the supporting rod 59 and the lower closure 112 is sealed as by Wilson's sealing means utilizing an O-ring so that the supporting rod 59 can be air-tightly moved into and out of the lower closure 112.

The reaction tube 57 is enclosed by an outer tube 115 of stainless steel to prevent the microwave energy from leaking out of the microwave discharge cavity which is surrounded by the outer tube 115. The outer tube 115 can be cooled by means of a cooling water jacket 116 which is mounted around the outer periphery thereof. The outer tube 115, includes an outlet 117 for a cooling gas so that the reaction tube 57 can forcibly be cooled by the cooling gas such as air, nitrogen and the like which is introduced through an inlet 118 formed in the waveguide 52 at its suitable position, for example, in one shorter side of the waveguide 52 if it is of rectangular cross-section.

A powder introducing pipe 119 for supplying the reaction vessel formed by the reaction tube 57 and the bottom plate 58 with a powdery material, extends through the cylindrical exhausting tube 110. The exit end of the powder introducing pipe 119 is positioned above a plasma generating area (formed substantially at the same level as that of the waveguide 52 and shown by intercrossing lines in FIG. 3).

A powdery material to be treated is introduced from a powder vessel 120 through the powder introducing pipe 119 and a valve 21 into the reaction vessel to be deposited on the bottom plate 58.

A gas introducing pipe 122 for supplying the reaction vessel with a reaction gas extends through the upper closure 111 with the exit end thereof also positioned above the plasma generating area. The gas and powder introducing pipes 119 and 122, respectively, may be combined with each other to form an integral double-structured pipe.

The illustrated embodiment is a treating apparatus for reducing and nitriding powdery silica ($SiO_2$) to produce silicon nitride ($Si_3N_4$). With reference to this, reaction-gas introducing means and powder supplying means will be described below in more detail:

Nitrogen gas, which is a reaction gas, is fed from a gas cylinder 123 to the gas introducing pipe 122 through a pipe 128 via a flowmeter 125 and valves 126 and 127. The powder vessel 120 includes supplying means 130 having a valve 129, and an exhausting pipe 134 connected with an exhausting device 133 through valves 131 and 132. The exhausting device 133 comprises a rotary pump 133a and a cold trap 133b. A portion of the exhausting pipe 134 between the valves 131 and 132 is connected with a portion of the gas introducing pipe 128 between the valves 131 and 132 by means of a cross-shaped connector 135 so that the nitrogen gas can be fed from the gas cylinder to the powder vessel 120 by manipulating the valves.

Exhausting means 136 is connected with the cylindrical exhausting tube 110 at the side wall thereof. This exhausting means 136 comprises a diffusion pump 136a, a rotary pump 135b and a cold trap 136c. The exhausting means 136 also includes an exhausting pipe 138 connected with the exhausting tube 110 through a powder collector 137 for collecting the powdery material contained in the exhausted gas.

Furthermore, there are provided an ionization vacuum gauge 139 for measuring vacuum degree in a system composed of the reaction tube 57 and cylindrical exhausting tube 110 during the exhaustion, and a diaphragm type pressure gauge 140 for measuring pressure in said system during the treatment of the powdery material.

As can be seen from the above-mentioned preferred embodiment of this invention, the treatment apparatus comprises the reaction tube 57 disposed vertically into which a powdery material to be treated is introduced to be deposited on the bottom plate 58. The reaction with respect to the powdery material is effectively made in a region (local reaction area) adjacent to an area in which plasma is produced under discharge. The powder on the bottom plate 58 cannot be blown off from the reaction vessel by the plasma blast. The powdery material temporarily stays in the plasma generating area and thereafter is deposited again on the bottom plate 58 while further reaction proceeds. In the plasma generating area, the plasma blast serves to agitate the powdery material so that a uniform treatment will be accomplished. According to this invention, the bottom plate 58 is gradually moved downward as the powdery material is being treated whereas fresh powdery material to be treated is introduced into the reaction vessel through the powder supplying means. Consequently, the powdery material to be treated always exists in the local reaction area so that the powdery material can be continuously treated. In the embodiment shown in FIG. 3, the lower closure structure 112 connected with the lower end of the reaction tube 57 includes the screw conveyor 113. Therefore, even after the bottom plate 58 has been moved to the bottom of the lower closure 112, the powdery material can continuously be treated by carrying the treated material to the container 114. The treatment by which powdery silica is converted into α-silicon nitride using the apparatus of the above-mentioned embodiment will concretely be described below:

Raw material was prepared by blending amorphous powder of silica, powdery carbon as a reducing agent, and α-silicon nitride as a seed substance in a ratio of 1:0.45:0.1 by weight.

This raw powdery material was introduced into the powder vessel 120 through the supplying portion 130. This was accomplished under such a condition that the powder vessel 120 had previously been exhausted through the exhausting pipe 133 and then charged with nitrogen gas and that nitrogen gas was fed to the powder vessel 120 through the valve 131 while exhausting it through the opened valve 129 to atmosphere. Thus, air (particularly, oxygen) and moisture can be prevented from entering into the powder vessel 120 together with the raw material.

Next, under such a condition that the valves 121 and 127 are closed, the diffusion pump 136a in the exhausting means 136 was actuated to exhaust the interior of the reaction tube 110 to about $10^{-6}$ Torr. Subsequently, the valve 136d of the diffusion pump 136a was closed and the valve 127 was opened to introduce the nitrogen gas into the reaction tube 110 while the latter was exhausted by the rotary pump 136b through the cold trap 136c. At this time, by controlling the valves 136e and 126, the pressure in the reaction tube 110 was maintained at 5 Torr and the nitrogen gas was kept at a flow rate of 300 cc/min. The bottom plate 58 was positioned below the plasma generating area as shown in FIG. 3.

Under such circumstances, the valve 121 was opened to supply the reaction tube 57 with the raw powdery material through the powder introducing pipe 119 at flow rate of 1.5 g/min to cause the material to be deposited on the bottom plate 58. At the same time as or before the raw powder was introduced into the reaction tube 57, the microwave generating device 51 was actuated to produce a microwave discharge under an electric microwave power of 3 KW and a frequency of 2450 MHz so that plasma of nitrogen gas would be formed in the area enclosed by the reaction tube 57 and bottom plate 58. Thus, the silica was reduced and nitrided under the influence of the carbon powder and active seed in the plasma.

During the above reaction, the raw powder of very light weight was blown up by the generated plasma and agitated in the plasma reaction area to effect a uniform reaction. Thereafter, the powder was gradually deposited on the bottom of the plasma area, that is, the bottom plate 58. As the amount of the deposited powder was increased, the bottom plate 58 was moved downward at a predetermined speed. The plasma area is limited under a given electric power of microwave and a given pressure of nitrogen gas. In order to cause unreacting deposit to exist always in the plasma area, therefore, the speed at which the bottom plate 58 is moved downward must be determined in consideration of the reaction rate, the diameter of the reaction tube 57 and others.

After a predetermined period of time required to make said reducing and nitriding reaction under plasma, the microwave discharge was terminated. The valves 121 and 136e were closed whereas the valves 124, 126 and 127 remained open. Thus, nitrogen gas was introduced from the gas cylinder 123 into the reaction tube 57 until the pressure therein became equal to atmosphere.

Thereafter, the bottom plate 58 was moved downward to its lowest position and the screw conveyor 113a was actuated to collect the treated material in the container 114. The treated material presented an appearance of dark-colored particles. The dark color is provided by the remaining carbon in the treated material. The treated material was then heated at temperature in the range of 700°–800° C. under atmosphere to form gray-colored powder.

The resultant powder was recognized to be silicon nitride ($Si_3N_4$) by use of X-ray diffractometry, infrared absorption spectrum, elementary analysis and the like.

The resultant silicon nitride weighed about 270 g for the amorphous silicon dioxide powder of 360 g. As a result, the recovery was 96%.

In the above apparatus which is a preferred embodiment of this invention, a radical having very high activity is produced to effect the reducing nitriding reaction under the influence of that radical. Therefore, the apparatus provides higher energy efficiency with a smaller amount of required reaction gas in addition to a higher recovery. Furthermore, the apparatus enables a continuous treatment in which a powdery material to be treated is supplied while the treated powdery material is collected to easily carry out. This leads to extremely high operating efficiency.

Although the reducing and nitriding reaction using a gaseous mixture of nitrogen and hydrogen or a nitrogen gas has been described in connection with the illustrated embodiments, this invention can be applied to, for example, powder nitriding treatment which utilizes a gas containing ammonia or the like; powder oxidizing treatment which utilizes oxygen or a gas containing oxygen; powder boride forming treatment which utilizes gaseous compound containing boron ($BCl_3$, $B_2H_6$, etc.); powder carbonizing treatment which utilizes gaseous compound containing carbon; or powder reducing treatment which utilizes hydrogen or a gas containing hydrogen.

FIG. 15 is a cross-sectional view showing another form of the powder collecting structure which is disposed on the bottom of the apparatus. In this Figure, the same parts as in FIG. 3 are designated by the same reference numerals as in FIG. 3. In this embodiment, the treated material is carried into the container 114 by means of a piston 152 after the bottom plate 58 has been moved to its lowest position. The piston 152 is retracted to a position 151 during treatment and can be reciprocated horizontally by means of a driving rod 153.

Where the time period required to treat the powder, that is, the time period during which the powder is in contact with the plasma is permitted to be shorter, the powdery material to be treated may be dropped simply from the powder introducing pipe after the bottom plate 58 has been moved below the plasma generating area. The dropped powdery material can be treated while it passes through the plasma generating area.

We claim:

1. An apparatus for treating powdery materials utilizing microwave plasma, comprising means for generating a microwave, a waveguide connected with said microwave generating means, a reaction vessel disposed through said waveguide, means for supplying said reaction vessel with a powdery material to be treated, means for supplying said reaction vessel with a reaction gas, and means for exhausting said reaction vessel;

wherein said reaction vessel comprises a vertically elongated vessel having an upper area air tightly connected to said exhaustion means and a bottom area disposed in said waveguide so that a plasma generating area is formed at the bottom area, said vessel having a central axis and being disposed such that said central axis is oriented substantially in the direction of gravity; and said reaction gas supplying means includes a gas introducing pipe having an outlet located adjacent said bottom area, and including a movable plate positioned such that said powdery material is supported in said bottom area whereby said powdery material is blown up and agitated by the plasma.

2. An apparatus according to claim 1, wherein said reaction vessel comprises a reaction tube disposed substantially vertically therein and a bottom plate horizontally supported in said reaction tube, said bottom plate being vertically slidable within said reaction tube with substantially no clearance between the side of the plate and the inner wall of the reaction tube.

3. An apparatus according to claim 2, wherein said bottom plate is a disc made of quartz or graphite.

4. An apparatus according to claim 2, wherein the reaction tube is further provided at a bottom end portion thereof with means for collecting treated powdery materials.

5. An apparatus according to claim 4, wherein the bottom plate is vertically slidable between a lower portion of the plasma generating area and the treated powdery materials collecting means.

6. An apparatus for treating powdery materials utilizing a microwave plasma, comprising:
means for generating microwave energy;
a wave guide connected to said microwave generating means;
a reaction vessel disposed through said wave guide, said reaction vessel being vertically oriented and having inlets for receiving a powdery material to be treated and a reaction gas, said reaction vessel further including a portion containing means for supporting powdery material in said wave guide, said supporting means comprising a movable plate positioned such that said powdery material is supported in said wave guide whereby said powdery material is blown up by the plasma and automatically agitated in the plasma reaction area resulting in a uniform reaction, and a powdery material outlet;
means for supplying one of said reaction vessel inlets with a powdery material to be treated;
means for supplying another of said reaction vessel inlets with a reaction gas; and
means for exhausting said reaction vessel.

7. An apparatus for treating powdery materials utilizing microwave plasma, comprising means for generating a microwave, a waveguide connected with said microwave generating means, a reaction vessel disposed through said waveguide, means for supplying said reaction vessel with a powdery material to be treated, means for supplying said reaction vessel with a reaction gas, and means for exhausting said reaction vessel;

wherein said reaction vessel comprises a vertically elongated vessel having an upper area air tightly connected to said exhaustion means and a bottom area disposed in said waveguide so that a plasma generating area is formed at the bottom area, said vessel having a central axis and being disposed such that said central axis is oriented substantially in the direction of gravity; and said reaction gas supplying means includes a gas introducing pipe having an outlet located adjacent said bottom area, and including a means for causing said powdery material to be supported in said waveguide in said bottom area whereby said powdery material is blown up and agitated by the plasma.

* * * * *